United States Patent
Peschke et al.

(10) Patent No.: US 12,416,913 B2
(45) Date of Patent: Sep. 16, 2025

(54) METHOD FOR THE AUTOMATED CREATION OF A SKILL INTERFACE, COMPUTER PROGRAM PRODUCT, AND DEVICE

(71) Applicant: SIEMENS AKTIENGESELLSCHAFT, Munich (DE)

(72) Inventors: Jörn Peschke, Nuremberg (DE); Schirin Bär, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 400 days.

(21) Appl. No.: 18/019,307

(22) PCT Filed: Aug. 4, 2020

(86) PCT No.: PCT/EP2020/071932
§ 371 (c)(1),
(2) Date: Feb. 2, 2023

(87) PCT Pub. No.: WO2022/028682
PCT Pub. Date: Feb. 10, 2022

(65) Prior Publication Data
US 2023/0280733 A1    Sep. 7, 2023

(51) Int. Cl.
*G05B 19/418*    (2006.01)
*G05B 19/4155*    (2006.01)

(52) U.S. Cl.
CPC ... *G05B 19/41885* (2013.01); *G05B 19/4186* (2013.01); *G05B 19/4155* (2013.01)

(58) Field of Classification Search
CPC .......... G05B 19/41845; G05B 19/4186; G05B 19/4155
USPC .......................................................... 700/29
See application file for complete search history.

(56) References Cited

U.S. PATENT DOCUMENTS

| | | |
|---|---|---|
| 2012/0265324 A1 | 10/2012 | Colombo et al. |
| 2017/0161026 A1 | 6/2017 | Wood et al. |
| 2018/0088548 A1 | 3/2018 | Sangi |
| 2019/0086894 A1* | 3/2019 | Tenorth .............. G05B 19/042 |

(Continued)

FOREIGN PATENT DOCUMENTS

| | | |
|---|---|---|
| CN | 102640068 A | 8/2012 |
| CN | 107567604 A | 1/2018 |

(Continued)

OTHER PUBLICATIONS

Dorofeev, Kirill, and Alois Zoitl. "Skill-based engineering approach using opc ua programs." In 2018 IEEE 16th international conference on industrial informatics (INDIN), pp. 1098-1103. IEEE, 2018.

(Continued)

*Primary Examiner* — Ronald D Hartman, Jr.
(74) *Attorney, Agent, or Firm* — Lempia Summerfield Katz LLC

(57) ABSTRACT

The invention relates to a method in which an information model having state graphs for the individual skills and general machine behaviour or error cases is created for the user in an automated manner. This drastically reduces the engineering effort for the subsequent implementation of skill interfaces and in many cases would make an economically viable implementation possible in the first place.

12 Claims, 4 Drawing Sheets

(56) References Cited

U.S. PATENT DOCUMENTS

| | | | |
|---|---|---|---|
| 2019/0171190 A1 | 6/2019 | Mcdaniel | |
| 2020/0262073 A1 | 8/2020 | Mcdaniel | |
| 2020/0278279 A1 | 9/2020 | Wilks | |
| 2022/0011748 A1* | 1/2022 | Richter | G05B 19/4155 |
| 2022/0035339 A1* | 2/2022 | Saunders | G05D 1/0088 |
| 2022/0244708 A1* | 8/2022 | Gemignani | G06F 8/34 |
| 2024/0261968 A1* | 8/2024 | Wang | B25J 9/1666 |

FOREIGN PATENT DOCUMENTS

| | | | | |
|---|---|---|---|---|
| CN | 109753284 A | | 5/2019 | |
| CN | 105530240 B | * | 9/2019 | G05B 19/4186 |
| CN | 111164522 A | | 5/2020 | |
| CN | 117873943 A | * | 4/2024 | |
| CN | 118075365 A | * | 5/2024 | |
| CN | 113064581 B | * | 11/2024 | G06F 8/30 |
| EP | 3470735 A1 | | 4/2019 | |
| EP | 3582125 A1 | | 12/2019 | |
| WO | 2018031005 A1 | | 2/2018 | |
| WO | 2019100000 A1 | | 5/2019 | |

OTHER PUBLICATIONS

Kaspar, Manuel, Jürgen Bock, Yevgen Kogan, Pierre Venet, Michael Weser, and Uwe E. Zimmermann. "Tool and technology independent function interfaces by using a generic OPC UA representation." In 2018 IEEE 23rd International Conference on Emerging Technologies and Factory Automation (ETFA), vol. 1, pp. 1183-1186. IEEE, 2018.

PCT International Search Report and Written Opinion of International Searching Authority mailed Apr. 26, 2021 corresponding to PCT International Application No. PCT/EP2020/071932.

Zimmermann, Patrick, Etienne Axmann, Benjamin Brandenbourger, Kirill Dorofeev, Andre Mankowski, and Paulo Zanini. "Skill-based engineering and control on field-device-level with opc ua." In 2019 24th IEEE International Conference on Emerging Technologies and Factory Automation (ETFA), pp. 1101-1108. IEEE, 2019.

* cited by examiner

FIG 3
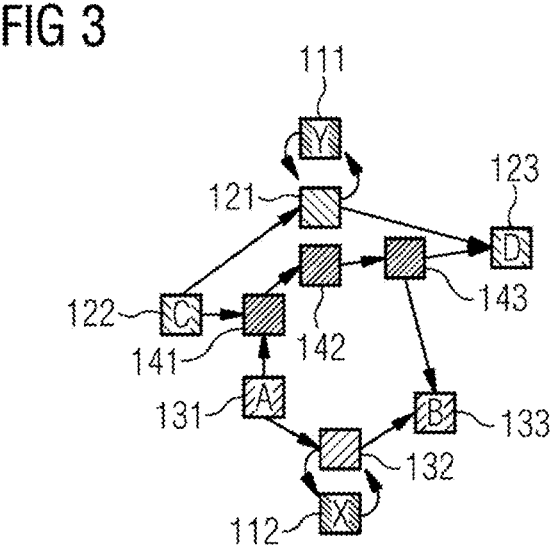
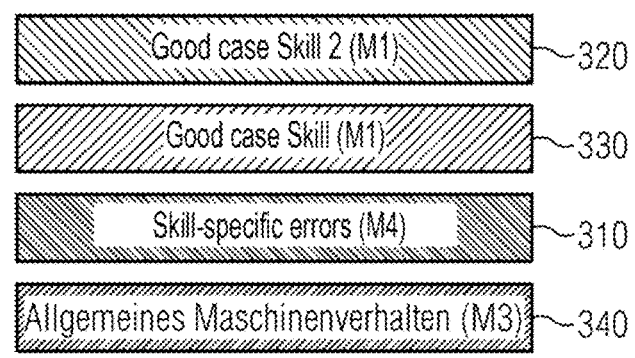

METHOD FOR THE AUTOMATED CREATION OF A SKILL INTERFACE, COMPUTER PROGRAM PRODUCT, AND DEVICE

CROSS REFERENCE TO RELATED APPLICATIONS

This present patent document is a § 371 nationalization of PCT Application Serial Number PCT/EP2020/071932, filed Aug. 4, 2020, designating the United States, which is hereby incorporated in its entirety by reference.

BACKGROUND

OPC unified architecture (OPC UA) is a standard for data exchange, for example in an industrial installation, as a platform-independent, service-oriented architecture (SOA). OPC UA has been published, inter alia, in the IEC 62541 standard series.

OPC UA information models play an increasingly important part as a uniform interface for the monitoring and control of machines and installations, particularly in industrial manufacture.

OPC UA companion specifications frequently form the basis for these information models. The "OPC UA Companion Specification for Robotics" (OPC UA Robotics for short) offers, for example, a standardized information model that may uniformly represent all robot-related data independently from the manufacturer and location. Asset management, state monitoring, preventive maintenance and vertical integration are thus enabled—anytime, anywhere in the world and independently from the manufacturer and robot type.

In different specifications (e.g., PackML—Packaging Machine Language), state machines are important for uniformly replicating and controlling the behavior of machines and installations. Today, it is normally possible to instantiate these models in an OPC UA server that runs directly on the controller (PLC or SoftPLC—Programmable Logic Controller).

In order to enable activation of the PLC by an external system, the state machine must therefore be replicated by a standardized (OPC UA) information model that is then placed on an OPC UA server and is made accessible to an OPC UA client. The client may then read the current state and instigate state changes by means of method calls. The engineering of this information model that replicates the state machine of the machine or installation is usually highly complex and is normally carried out manually, so that detailed knowledge of the modelling of the state machine in the OPC UA information model and of the mode of operation of the state model within the PLC program is necessary here.

Whereas a certain level of engineering support is now already possible for systems requiring new programming (e.g. through automatic generation of the model and interconnection with the PLC code), the situation for "brownfield" installations appears to be significantly more complex.

This refers to installations having an existing software and architecture concept in which newly developed software must be integrated into the existing software and architecture concept. In contrast to completely new development (also referred to as greenfield development), further development must comply with structural boundary conditions. The precise mode of operation of the control program is often not known or is totally inaccessible. If a state machine that replicates the behavior is then to be implemented, this is highly complex or even totally impossible.

Along with standards such as PackML, skill-calling interfaces also represent an important application. The term "skill" is generally understood to mean the capability of a resource to perform specific functions, i.e., for example, to carry out a specific step of a production process. Skills consist of a skill service (the function) and the skill interface (the associated interface). Skills may also be used to describe a production process, for example executed on an automation installation. The aim, based on the required capabilities, is to identify the resources suitable for each step of the production process by means of the skills, rather than having to specify the actual production resources. The economically viable subsequent implementation of such skills and, in particular, their interfaces in existing installations, is, as already described above, an unsolved problem today due to the substantial manual effort required.

The only current method for subsequent implementation of skill interfaces involves manual engineering and creation of the information model with tools such as the "UaModeler" or "SiOME". Although the latter tool may offer restricted capabilities for automatic creation of information models from PLC code, the model to be created would already have to be exactly replicated in the same structures so that this function may be used in the application concerned. This is unrealistic in a brownfield situation.

The entire mode of operation of the state machine would therefore have to be known to the creator so that he correctly models each state and each transition with method calls and references. The aim of systems that analyze the behavior of an installation is to parameterize models that are intended to optimize or control the installation.

BRIEF SUMMARY AND DESCRIPTION

The scope of the embodiments is defined solely by the appended claims and is not affected to any degree by the statements within this summary. The present embodiments may obviate one or more of the drawbacks or limitations in the related art.

Embodiments automatically replicate the behavior of states and transitions in an information model as a skill interface.

The method described below aims to create an information model for a brownfield installation or machine automatically without the user having detailed knowledge of the control code of the controllers involved. This information model is intended to be used as a skill interface in order, for example, to enable an OPC UA client to observe the states of skills uniformly and, if necessary, trigger the execution of skills and receive result feedback.

BRIEF DESCRIPTION OF THE FIGURES

FIG. 3 depicts differentiation as a result of the division according to an embodiment.

DETAILED DESCRIPTION

Figure 1:
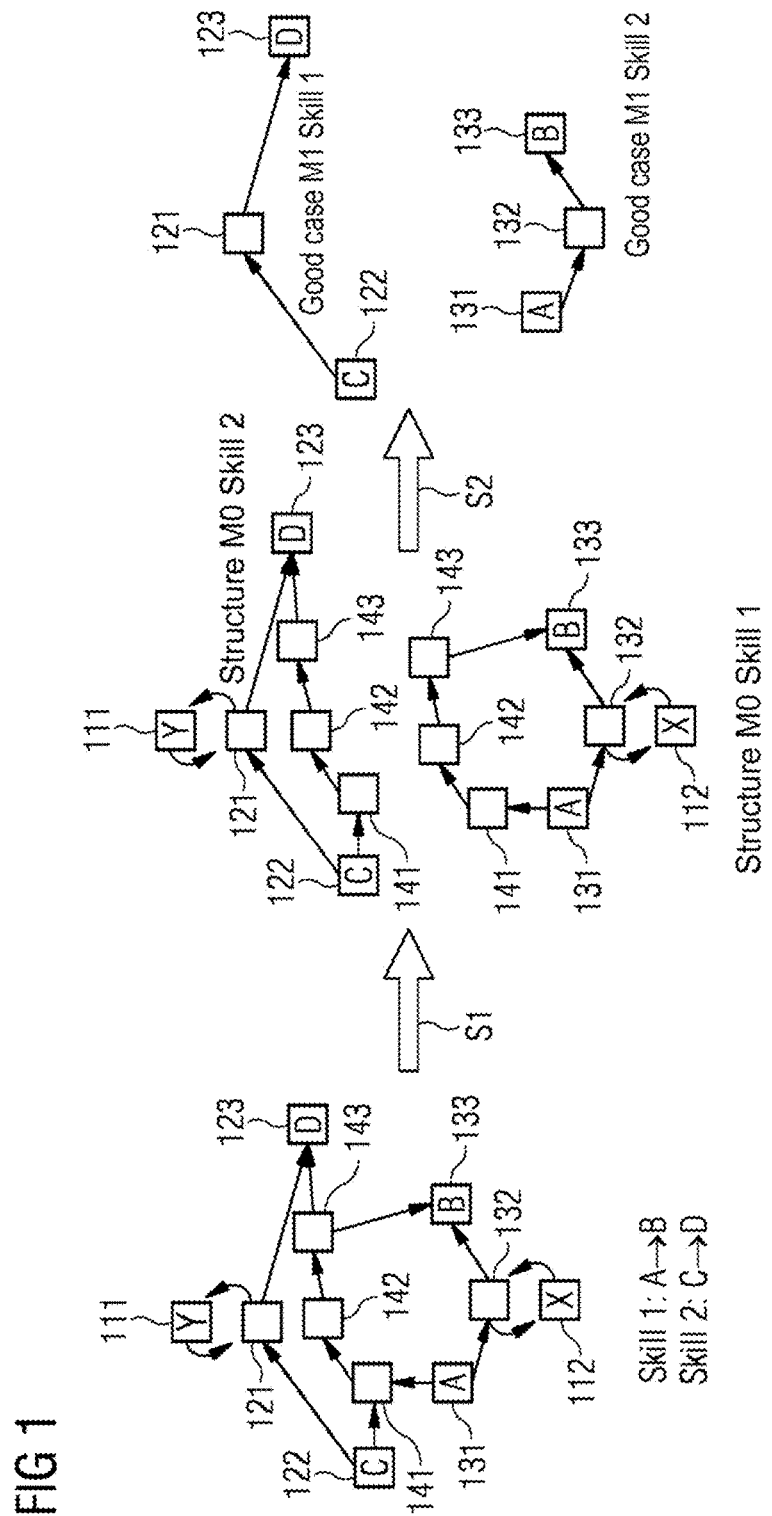
FIG. 1 depicts a state graph and separation into subtrees according to an embodiment.
Figure 2:
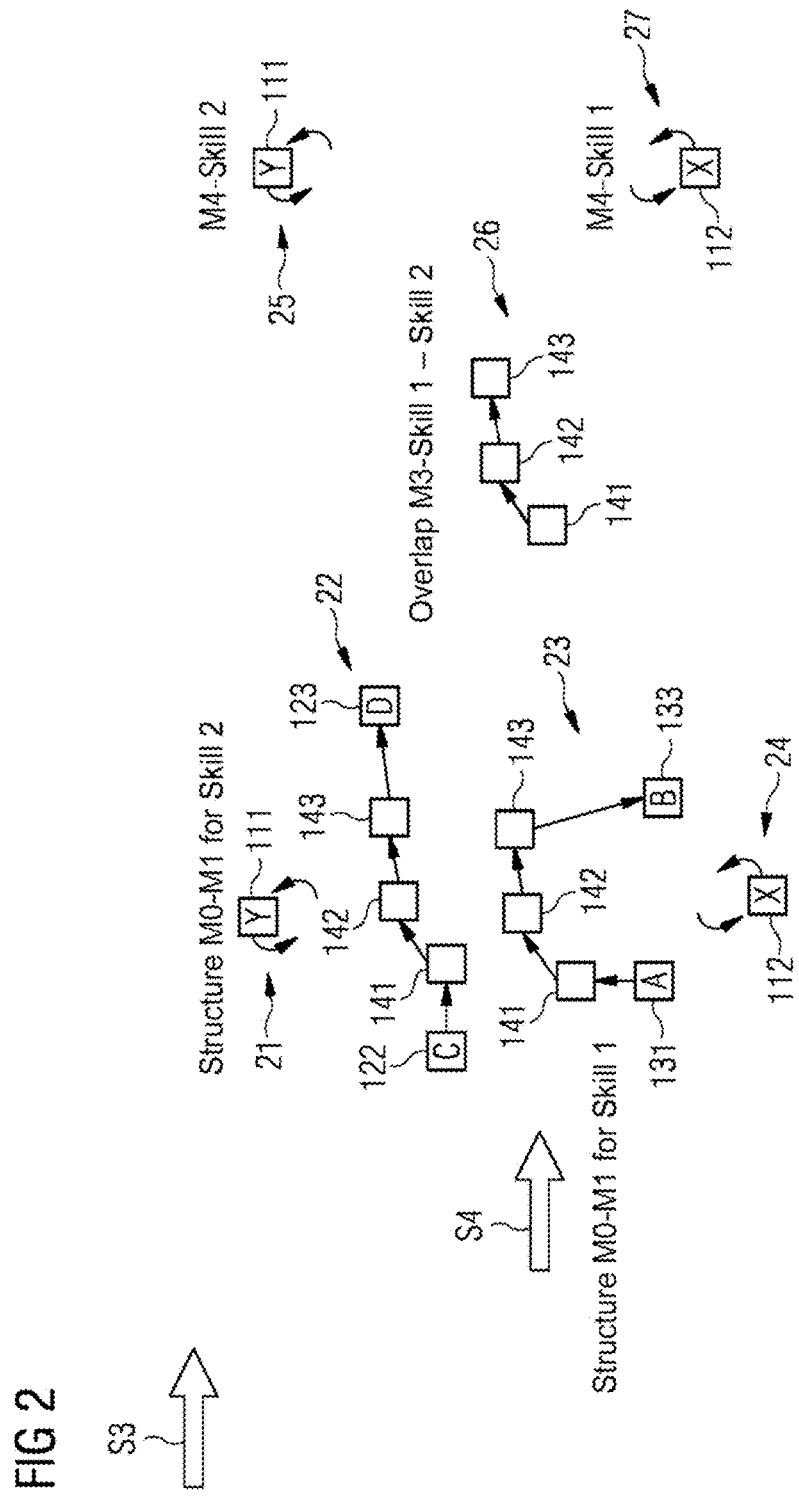
FIG. 2 depicts method steps without overlap according to an embodiment.

FIGS. 1 to 3 depict the separation and characterization of subtrees on the basis of a very simple state graph.

Phase 1: Identifying the States of the System

To do this, all states which the system may assume are first identified by observing accessible variables.

This may be done, for example, by the method for automated labelling of signatures with signals from automation systems, similar to the method described in EP 3579072 A.

A quantization of a state temporal sequence recorded with reference to an installation is first adapted so that all states included in the state temporal sequence have at least a state duration above a predefined minimum time. Installation states are then determined on the basis of state changes in at least one state temporal sequence. The segments of a recorded, synchronous data temporal sequence occurring between the locations of two consecutive installation states are then determined and are provided with an identifier that indicates an installation state determining a signature.

The obtained state quantities are then adjusted, if necessary, to the desired granularity (i.e. the number of desired state classes), as described, for example, in EP 3 579 073 A, by a method for automatically combining (aggregating) signatures. As described above, segments in at least one synchronous data temporal sequence between two consecutive installation states are defined as signatures. A duration of each determined signature is compared with a minimum duration. A signature having a duration less than the minimum duration is combined with an adjacent signature according to a defined rule.

A general state model is then derived. A graph may be constructed, for example, by observing the system behavior, with states and relationships between the states. The graph is then transferred into an information model by suitable rules. A state, for example, is created as a state object, a transition as a transition object, a relationship between states as a relation, and an action that triggers a specific response as a method.

The state is automatically identified as either a wait state or a transition state. Higher-level state machines are also identified and modelled accordingly. The references and methods are similarly modelled in the information model.

The following preconditions must be met so that these steps may be carried out appropriately:

The variables that uniquely characterize the state of the installation/machine must be accessible.

In most automation systems, this may normally be done by various methods, for example by analyzing the bus communication between controllers, the communication to the sensors, the local peripherals and the HMIs, or by observing live variable values directly in automation programs, control projects.

In order to correctly identify the states of the system, all states to be replicated must be passed through at least once.

This prerequisite may be met either by activating the desired states through a targeted approach, or by observing the operation of the installations over a sufficiently long time period. In this case, it may occur that situations are nevertheless not identified, but may then be detected later and treated separately. The relevant details are described in phase 3 of the method.

The result of phase 1 is a general state model that describes the behavior of the system, but does not yet enable a more specific understanding of the situation or a targeted control of behaviors. Fundamental behaviors such as, for example, the differentiation between wait states, transitions (instantaneous transitions), transition states and structures (e.g., substrate machines) are already taken into account here.

Phase 2: Differentiating the State Model

Differentiation may then be performed based on the general state model created in phase 1.

If a skill interface is intended to be created for at least one production step, the production step for which this is intended to be performed must first be defined. The respective start state A, C and the associated end states B, D of the production step and the associated desired skill must be indicated in the state model for this purpose.

This may be done, for example, by simply identifying (tagging) the situation in the state identification in phase 1. The start or call of production functions may be closely observed in a system (in contrast to internal processes in the PLC program), since automated systems involve communication between production control and installation control). The times of the start of a production step may be determined by evaluating this communication. Alternatively, a user who observes the system from the outside only may also indicate the time of the start and end of a production step.

This is advantageous in the situation of the brownfield analysis, since the user does not need to have a more precise, detailed knowledge, for example, of an assignment of variables.

If an automatic activation of functions already exists (elsewhere), this communication may similarly be used for tagging.

In addition, normal passes (i.e., successful production steps without errors) may already be marked. If a production installation is one in which the successful execution of production steps is the norm (that should be the case for the majority of installations), this may be done automatically by selecting the most frequent sequences. In contrast, errors or anomalies rarely occur.

On the basis of a model determined in this way having unique identifiers for each state (i.e., each state is unique in terms of the machine/installation behavior) and characterized start and end states for each skill, the following algorithm is executed. This procedure is further shown by way of example in FIGS. 1 and 2. Two skills are implemented in the graph, wherein skill 1 is represented by a path from node A, 131, to node B, 133. Skill 2 is represented by the path between node C, 122, and node D, 123. Nodes X, 112, and Y, 111, represent skill-specific errors.

A state graph is shown having different states 111, . . . 143 that are interconnected to form a graph.

Step 1: extracting all paths that, beginning at the starting point of the production process, may end with a completion of the production step (possibly also with error message or interruption) 12, structure M0 Skill2, 13, structure M0 Skill1.

The segment of the state model thus obtained includes: the desired functional process, i.e. the actual skill, i.e. the path from node A to node B via nodes 122, 121, 123.

Nodes further exist that represent a general machine behavior, i.e. method steps that may be associated with a variety of skills, that, in the example shown, are nodes 141, 142, 143.

Special error cases X, 112, Y, 111, and possibly also further general error cases not shown in detail in the present example also exist.

Step 2 then results in a replication with individual graphs as shown in 14, good case M1 Skill1, 15, good case M1 Skill2 that in each case represent subgraphs of the original graph. These subgraphs that include the normal sequence or all possible sequences of the individual steps of the desired production steps from the start A, C to the destination B, D are created by extracting sequences of states from the state quantities found in step 1 that describe the "good case", i.e., the normal execution of the skill.

The states that are associated with this normal sequence may be determined in various ways. This may either be determined already in phase 1 during the selection of the skills. Alternatively, a sequence for each partial quantity found in step 1 may again be triggered and observed through a targeted approach.

All states that have been passed through then belong to the "good case" of the skill pass and are incorporated into the subgraphs 12, 13.

If this replication is required for a plurality of production steps/skills, step 1 and 2 are repeated for each desired skill.

Step 3: all hitherto identified structures that represent "good cases" are then compared with one another.

If matches are found, these sequences or states are marked as a jointly used functionality between different skills. (M2-Skill n-Skill m)

The example shown in the figures involves nodes 141, 142, 143 (and the associated connections between them).

Conversely, if no common structures exist between skills, these skills are functionally independent.

Step 4: the "good cases" identified in step 3 are then subtracted from the individual skill structure state graphs, i.e., the identified state subgraphs 14, 15 from the entire graph 11, and all state quantities thus obtained are again compared. In the example shown, four subgraphs 21, 22, 23, 24 remain.

If matches are found, these areas are characterized as general machine behavior or general error cases. This again involves nodes 141, 142, 143, as in the case already described in FIG. 1.

The areas for which no matches are found are, for example, skill-specific error cases X, Y or skill-specific machine behavior (e.g., setup routines) M4-skill n.

The result of the formation of partial quantities and characterization of the states in phase 2 is then used to construct the desired information model.

FIG. 3 depicts the initial graphs once more, but now with correspondingly marked states. The two state sequences 121, 122, 123 and 131, 132, 133 are shown for the two desired skills with the start and end states A-B and C-D respectively. The general machine behavior 141, 142, 143 that may be jointly used by both skills is shown. (Skill-specific) error routines 111, 112 are shown. All determined states of the state graph are thus uniquely assigned to one of the four categories.

Figure 4:
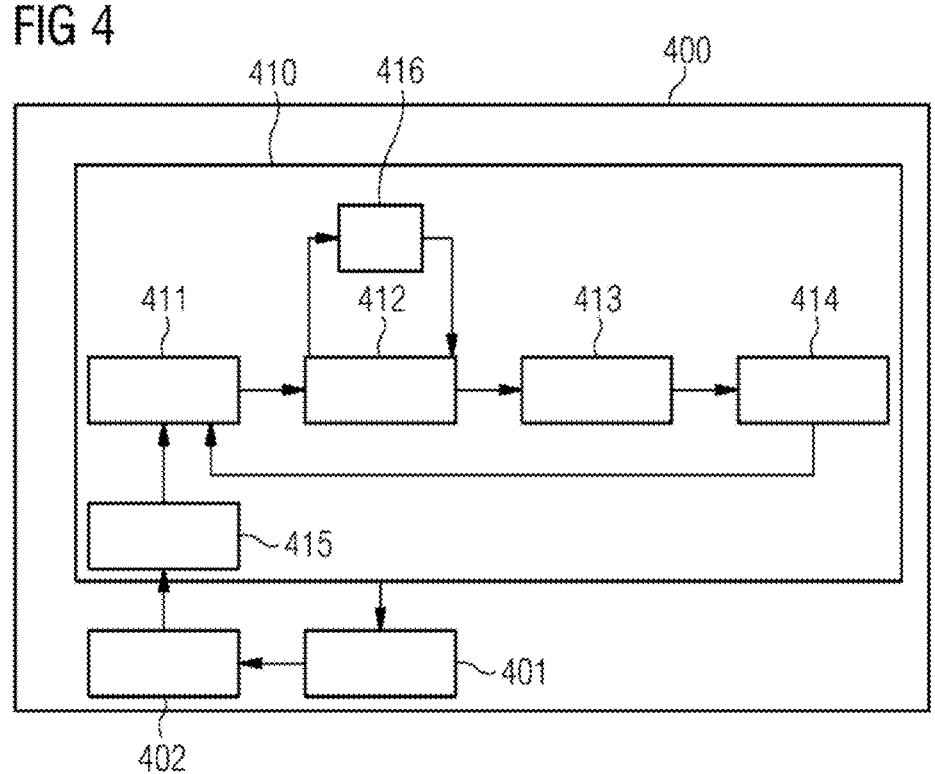
FIG. 4 depicts a skill state machine according to an embodiment.
Figure 5:
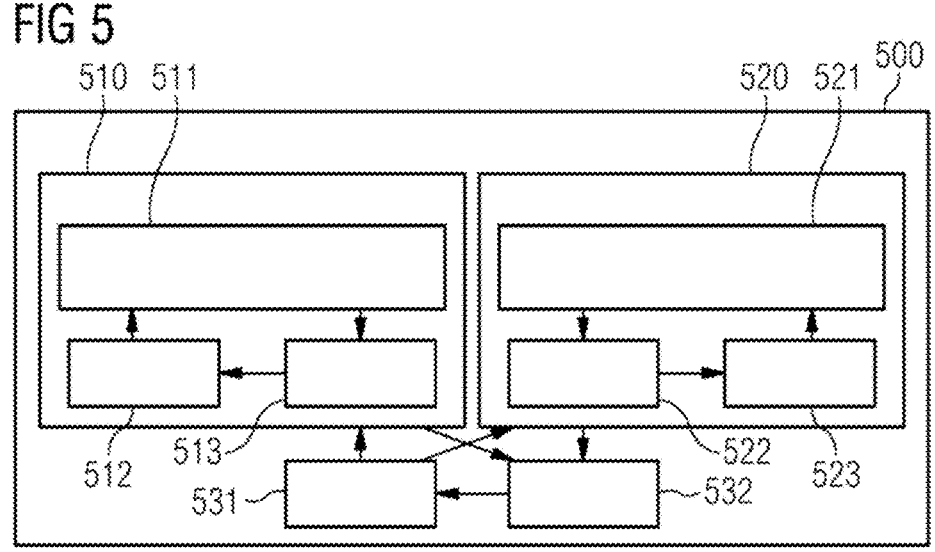
FIG. 5 depicts a machine state machine having two skills according to an embodiment.

FIG. 4 depicts a typical simplified state model for an example of a skill, and FIG. 5 depicts the embedding of at least two skills into a machine state model. The identified states with the rules described below may be mapped onto this model. Either all states may be shown in one plane and the "standard states" (as in FIG. 4) may be particularly marked or substrate machines containing the additional fine-granular states may be formed if a plurality of identified states correspond to a skill state.

A defined sequence of the call (M1-Skilln) and specific errors or interruption sequences (M4-Skill n shown in phase 2 in FIG. 2, the states X and Y, 111, 112) exist for each skill 400.

FIG. 4 depicts generically the states of the good case in the box 410. Based on an idle state 11, the desired skill 400 transfers to an execute state 412. In the example of the robot, the robot could start to process a workpiece.

If required, the execution may be interrupted in the meantime by the hold state 16. This may be necessary, for example, if the processing has to be interrupted because the processing tool needs to be exchanged or an interruption occurs for a different reason. As soon as the procedure is completed, i.e., for example, the workpiece processing has finished, the workpiece may be removed from the holder, for example in a completing state 413, and may then transfer, in a complete state 414, again via an idle state, to the idle start state 411 in order to continue with the processing of a further workpiece. As soon as an error occurs in the skill, a skill-specific error state 401, 402 is assumed, via which the normal processing operation may be resumed by the installation reset 415.

General machine behavior and general error routines form the framework for the components of the skill calls (M3). It is therefore also possible to identify when a skill is executed or may be called, and when it cannot.

In FIG. 5, two skills 510, 520 are executed in parallel in a machine state machine 500. The state sequences of the skills are simplified but are similar to the case 410 shown in FIG. 4. However, the figure further depicts two states 531, 532 that are used jointly by both skills and therefore represent the general machine behavior.

A method that triggers the transition from the start state into subsequent states is created for calling skills. If a plurality of subsequent states exists, the variables of the state that differ there are added as parameters to this call, i.e., the system identifies differences and automatically creates the method with input variables.

The call of skills Skill 1, Skill 2 that have jointly used sequences (M2) are interlocked. If, for example, a common structure M2-Skill 1-Skill 2 exists, Skills 1 and 2 cannot be executed in parallel.

Conversely, skills that have no common structures are algorithmically independent.

Finally, a separate exception state is also introduced that the system assumes if a hitherto unknown variable combination occurs. This indicates that the state is either new or was not detected in phase 1. In both cases, the user may decide whether to pass through the method once more with this additional state in order to incorporate it also in the solution.

It is thus possible to generate an information model automatically for observing behavior and for calling skills, and to interconnect it with the controller of the machine without the user requiring a detailed knowledge or understanding of the control program. An additional comparison with existing call mechanisms for the corresponding function is possibly appropriate for interconnecting the triggering of skills. On the information model side, the method is interconnected with the corresponding "method" function module in the PLC program, i.e., the method function module that is intended to be called by the industrial controller if this method is called.

The method described above enables the automatic mapping of behavior or of a state model derived therefrom onto a uniform OPC UA information model. In summary, a number of advantages are gained compared with manual creation.

An automated interconnection of the information model with the control variables is enabled.

Data consistency between the information model and the control variables (particularly in the event of changes) is ensured. The proposed method may be applied repeatedly at different times and without substantial effort using the existing data.

No additional engineering effort is required on the part of the user thanks to the automated generation of the information model. No above-average knowledge of the installation and the skills contained therein is required.

There is also no need to understand the semantics of the control code.

The control code does not have to be analyzed for the application of the method, that would be time-consuming and susceptible to error.

The method is independent from the controller manufacturer and the programming language, also thanks to the use of standardized methods for state changes from wait states. Wait states and transition states are distinguished from one another by an automated and rule-based process.

An information model with state graphs for the individual skills and general machine behavior or error cases is created automatically for the user. This drastically reduces the engineering effort required for the subsequent implementation of skill interfaces and in many cases would even enable an economically viable implementation in the first place (in some cases, a complete or extensive re-implementation of the automation functions would otherwise be required).

It is to be understood that the elements and features recited in the appended claims may be combined in different ways to produce new claims that likewise fall within the scope of the present embodiments. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present embodiments have been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for an automated creation of a skill interface for a production step carried out in a system, the method comprising:
   detecting all states of the system;
   creating a general state model consisting of the detected states and relationships between the detected states;
   transferring the general state model into an information model;
   defining a start state and an end state of the production step within the general state model,
   determining all sequences of states from the start state to the end state of a required skill,
   separating all sequences of method steps that are associated with further skills,
   separating states for error handling of the required skill.

2. The method of claim 1, wherein each state must be activated and passed through at least once in a targeted manner in order to detect the states.

3. The method of claim 1, wherein the system is observed over a time period in which each state has been passed through at least once in order to detect the states.

4. The method of claim 1, wherein at least two production steps are intended to be identified within the general state model, wherein a sequence of method-steps of a first skill that is also associated with further skills is performed by comparing matches in determined state graphs of the first skill with determined sequence state graph of a second skill, and the state sequence determined in this way is marked and removed from the state graphs.

5. The method of claim 1, wherein the start state and the end state of the production step are determined by passing through a skill and identifying the states in a targeted manner.

6. The method of claim 1, wherein the information model is formed according to a OPC-UA standard.

7. A non-transitory computer readable storage medium comprising a set of computer-readable instructions stored thereon for creating a skill interface for a production step, the computer-readable instructions which, when executed by at least one processor cause the at least one processor to:
   detect all states of a system;
   create a general state model consisting of the detected states and relationships between the states;
   transfer the general state model into an information model;
   define a start state and an end state of the production step within the general state model;
   define all sequences of states from the start state to the end state of a required skill;
   remove all sequences of method steps that are associated with further skills; and
   remove states for error handling of the skill.

8. The non-transitory computer readable storage medium of claim 7, wherein each state must be activated and passed through at least once in a targeted manner in order to detect the states.

9. The non-transitory computer readable storage medium of claim 7, wherein the system is observed over a time period in which each state has been passed through at least once in order to detect the states.

10. The non-transitory computer readable storage medium of claim 7, wherein at least two skills/production steps are identified within the general state model, wherein a sequence of method steps of a first skill that is associated with further skills is performed by comparing matches in determined state graphs of the first skill with determined sequence state graph of a second skill, and the state sequence determined in this way is marked and removed from the state graphs.

11. The non-transitory computer readable storage medium of claim 7, wherein the start state and end state of the production step are determined by passing through a skill and identifying the states in a targeted manner.

12. The non-transitory computer readable storage medium of claim 7, wherein the information model is formed according to a OPC-UA standard.

* * * * *